(12) United States Patent
Nguyen et al.

(10) Patent No.: US 7,193,620 B2
(45) Date of Patent: Mar. 20, 2007

(54) WIRELESS DEVICE LIGHTING SYSTEM

(75) Inventors: Bach L. Nguyen, Plantation, FL (US); Julio C. Castaneda, Coral Springs, FL (US); Humberto E. Garcia, Miami Lakes, FL (US); Jose Felix Rodriguez, Miami, FL (US); Brian Scott Simpson, Sunrise, FL (US); Erik J. Walls, Coral Springs, FL (US); Jeffrey Michael Buczek, Plantation, FL (US)

(73) Assignee: Motorola, Inc., Schaumburg, IL (US)

( * ) Notice: Subject to any disclaimer, the term of this patent is extended or adjusted under 35 U.S.C. 154(b) by 127 days.

(21) Appl. No.: 10/623,890

(22) Filed: Jul. 21, 2003

(65) Prior Publication Data

US 2005/0017948 A1    Jan. 27, 2005

(51) Int. Cl.
    *H04M 1/00* (2006.01)
(52) U.S. Cl. .................. 345/204; 345/84; 345/206; 345/864; 340/825.72; 379/428
(58) Field of Classification Search .................. 345/39, 345/40, 44, 46, 87, 864; 340/825.72; 349/65; 349/113; 362/26, 27, 31; 379/428
    See application file for complete search history.

(56) References Cited

U.S. PATENT DOCUMENTS

| | | | |
|---|---|---|---|
| 5,905,442 A * | 5/1999 | Mosebrook et al. | ......... 340/3.7 |
| 6,140,987 A | 10/2000 | Stein et al. | |
| 6,171,396 B1 * | 1/2001 | Tahara | ........................ 117/204 |
| 6,215,936 B1 | 4/2001 | Yoshikawa et al. | |
| 6,259,854 B1 | 7/2001 | Shinji et al. | |
| 6,314,226 B1 | 11/2001 | Nath | |
| 6,329,968 B1 * | 12/2001 | Cornelissen et al. | ......... 345/87 |
| 6,352,350 B1 | 3/2002 | Ma | |
| 6,392,342 B1 | 5/2002 | Parikka | |
| 6,447,135 B1 | 9/2002 | Wortman et al. | |
| 6,474,826 B1 * | 11/2002 | Tanaka et al. | .............. 362/612 |
| 6,501,581 B1 * | 12/2002 | Snyder et al. | .............. 398/129 |
| 6,720,863 B2 * | 4/2004 | Hull et al. | ................. 340/7.51 |
| 6,827,460 B2 * | 12/2004 | Higuchi | ...................... 362/609 |
| 2002/0067444 A1 * | 6/2002 | Paolini et al. | ................. 349/65 |

(Continued)

OTHER PUBLICATIONS

JP 2003057650 Liquid crystal display device includes light guide plate, with reqaulators that guide and arrange LEDs mounted on detachable substrate; Pub. Date Aug. 16, 2001.*

*Primary Examiner*—Richard Hjerpe
*Assistant Examiner*—Vincent E. Kovalick

(57) ABSTRACT

A wireless device lighting system provides backlighting of a display (104) and/or a user interface (1526) of a wireless device (100). A user interface (1526) includes a plurality of buttons (112) for entering information and at least one multicolor LED for emitting light. The at least one multicolor LED is located behind the plurality of buttons (112). The user interface (1526) further includes a connector for connecting the user interface (1526) to the wireless device (100) and a circuit board for mounting the at least one multicolor LED and the connector. The user interface (1526) further includes a light pipe for allowing light emitted from the at least one multicolor LED to be emitted from the buttons (112), the light pipe located between the at least one multicolor LED and the buttons (112). The user interface (1526) further includes a selector for allowing a user to define a color of light for emission by the at least one multicolor LED.

5 Claims, 6 Drawing Sheets

U.S. PATENT DOCUMENTS

2002/0085379 A1* 7/2002 Han et al. .................... 362/227
2002/0142840 A1 10/2002 Wolinsky
2002/0149798 A1* 10/2002 Liu ........................... 358/406
2002/0172039 A1* 11/2002 Inditsky ...................... 362/231
2003/0002246 A1* 1/2003 Kerr ........................... 361/683
2003/0095525 A1* 5/2003 Lavin et al. ................ 370/338
2003/0109244 A1* 6/2003 Tendler ...................... 455/345
2003/0153280 A1* 8/2003 Kopp et al. .................. 455/90
2003/0185371 A1* 10/2003 Dobler .................. 379/207.02
2003/0220022 A1* 11/2003 Kawaguchi et al. ........ 439/633
2003/0222148 A1* 12/2003 Schmidt et al. ........ 235/462.45

* cited by examiner

US 7,193,620 B2

WIRELESS DEVICE LIGHTING SYSTEM

FIELD OF THE INVENTION

The present invention generally relates to the field of wireless devices, and more particularly relates to a lighting system for use in wireless devices.

BACKGROUND OF THE INVENTION

With the advent of messaging devices and mobile telephones, the wireless service industry has grown into a multi-billion dollar industry. The Cellular Telecommunications and Internet Association calculates that 120 million Americans own a mobile telephone—about half of the U.S. population. As the development of mobile telephones progresses, many mobile customers are upgrading to pricier phones and phone services that include a plethora of features and settings. One aspect of the consumer mobile market that has enjoyed recent popularity is the sale of customization items. Customization items are items that are used by consumers to make their wireless devices more unique or identifiable. Examples of customization items are colored or patterned faceplates, special ring tones and display graphics. Typical keypads on a wireless device, however, are backlit using only one color of light. As consumers seek more sophisticated products, there is a need to provide more customizability in mobile products.

One obstacle to providing customization items to consumers is the light pipe typically used in wireless devices to disperse light among the display, i.e., backlighting the display. The light pipe captures light from LEDs and disperses the light in a substantially even manner among the area of the light pipe, so as to backlight a display. Most wireless devices, however, are designed such that the light pipe captures only the light from only one LED or one set of LEDs. If another LED or set of LEDs were added to the system and was located in a different position, the light pipe would not be able to capture the light emitted from that LED or set of LEDs. This is disadvantageous as it prevents a manufacturer from providing an upgrade product including a new LED or set of LEDs for backlighting a display.

Another problem encountered with mobile products is that backlighting of displays is not always uniform. A display is typically backlit to allow a user to see the display when the mobile telephone is located in an area having little or no ambient light. However, often there are dark areas in a display that appear because the light emitted from backlighting Light Emitting Diodes (LEDs) is not reflected onto these areas of the display. Because these dark areas are not backlit or illuminated, the information displayed in these areas of the display may not be seen, or may be difficult to see, when the wireless device is located in an area having little or no ambient light.

Therefore a need exists to overcome the problems with the prior art as discussed above.

SUMMARY OF THE INVENTION

Briefly, in accordance with the present invention, disclosed is a wireless device lighting system for providing backlighting of a display and/or an interface of a wireless device. In one embodiment of the present invention, an interface for coupling to a wireless device is disclosed. The interface includes a plurality of buttons for entering information and at least one multicolor LED for emitting light, the at least LED located behind the plurality of buttons. The interface further includes a connector for connecting the interface to the wireless device and a circuit board for mounting the at least one LED and the connector. The interface further includes a light pipe for allowing light emitted from the at least one LED to be emitted from the plurality of buttons, the light pipe located between the at least one LED and the plurality of buttons. The interface further includes a selector for allowing a user to define a color of light for emission by the at least one LED.

In another embodiment of the present invention, a light guide for use in a wireless device is disclosed. The light guide includes a first light-conducting element for receiving light from a first set of at least one LED, the first set of at least one LED being integrally formed with the wireless device. The light guide further includes a second light-conducting element for receiving light from a second set of at least one LED, the second set of at least one LED being detachably coupled with the wireless device. The light guide further includes a third light conducting element for conducting light from the first set and the second set of at least one LED to backlight the LCD.

In another embodiment of the present invention, a light spreader for use in a wireless device is disclosed. The wireless device includes an LCD for displaying information and at least one LED for backlighting the LCD, the at least one LED located at one end of the LCD and disposed so as to emit light towards the LCD. The light spreader includes a light reflecting element having a convex shape, the light reflecting element facing the at least one LED. The light spreader further includes a light reflecting element having a convex shape for dispersing light from the at least one LED to backlight the LCD, the light spreader located at a second end of the LCD. The light reflecting element faces the at least one LED and comprises a mirror surface.

DETAILED DESCRIPTION

The present invention, according to a preferred embodiment, overcomes problems with the prior art by providing an improved lighting system for use in a wireless device.

Figure 1:
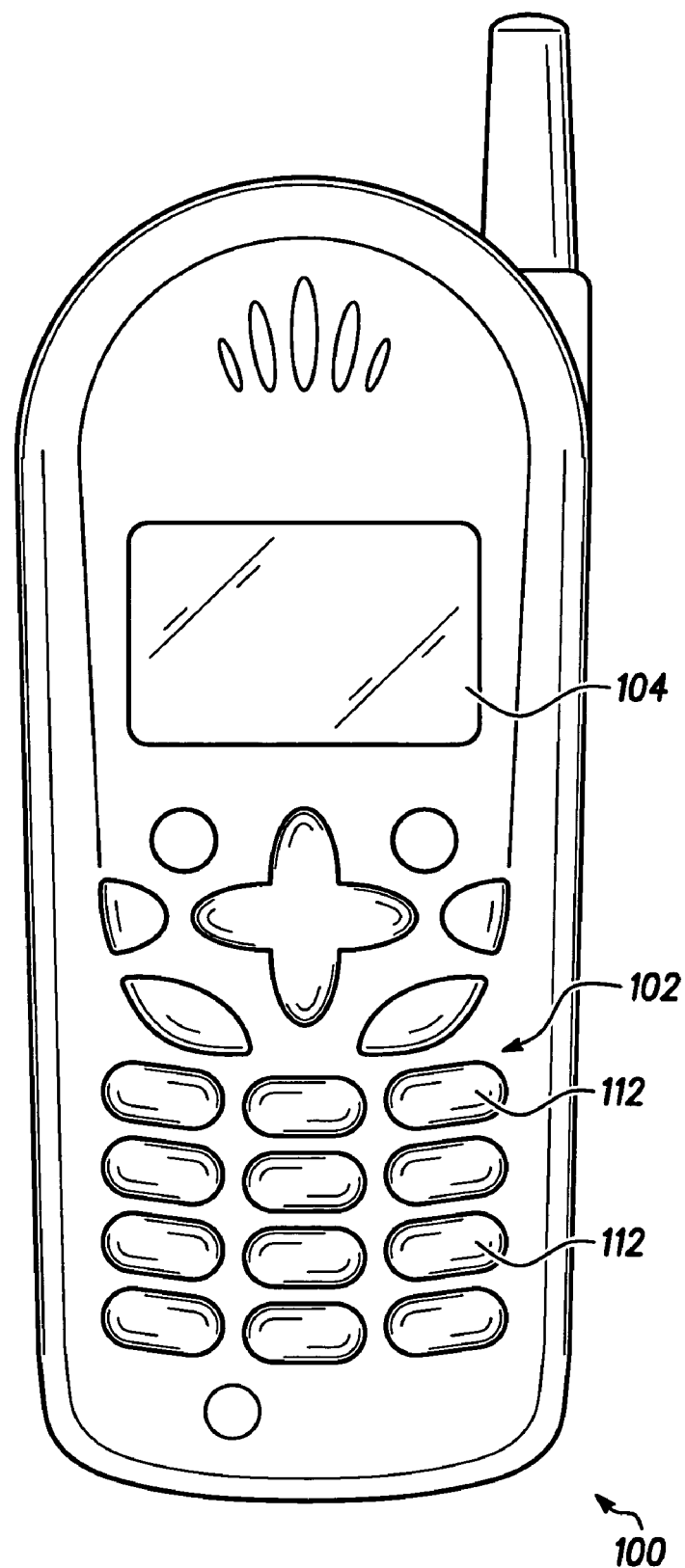
FIG. 1 is an illustration of a wireless device.

FIG. 1 is an illustration of a wireless device. FIG. 1 shows a mobile telephone wireless device. The mobile telephone 100 of FIG. 1 is a two-way radio capable of receiving and transmitting radio frequency signals over a communication channel under a communications protocol such as Code Division Multiple Access (CDMA), Time Division Multiple Access (TDMA), Global System for Mobile Communications (GSM), General Packet Radio Service (GPRS), Frequency Division Multiple Access (FDMA) or the like.

The mobile telephone 100 includes a keypad 102, and/or user interface, including a plurality of buttons, such as buttons 112, for entering information, such as telephone numbers, and providing commands, such as answering a telephone call or initiating a telephone call. The keypad 102 is typically backlit to allow a user to see the buttons 112 when the mobile telephone is located in an area having little or no ambient light. A keypad 102 can be backlit using a Light Emitting Device (LED), an Electro Luminescent (EL) panel or other light-emitting device.

The mobile telephone 100 further includes a display 104 for displaying information pertaining to the use of the mobile telephone 100, such as telephone numbers and call status information. The display 104 can be an LCD, a PDP or any other display type for presenting information. The display 104 is typically backlit to allow a user to see the display 104 when the mobile telephone is located in an area having little or no ambient light. A display 104 can be backlit using an LED, an EL panel or other light-emitting device. The mobile telephone 100 is described in greater detail below with reference to FIG. 15.

Figure 2:
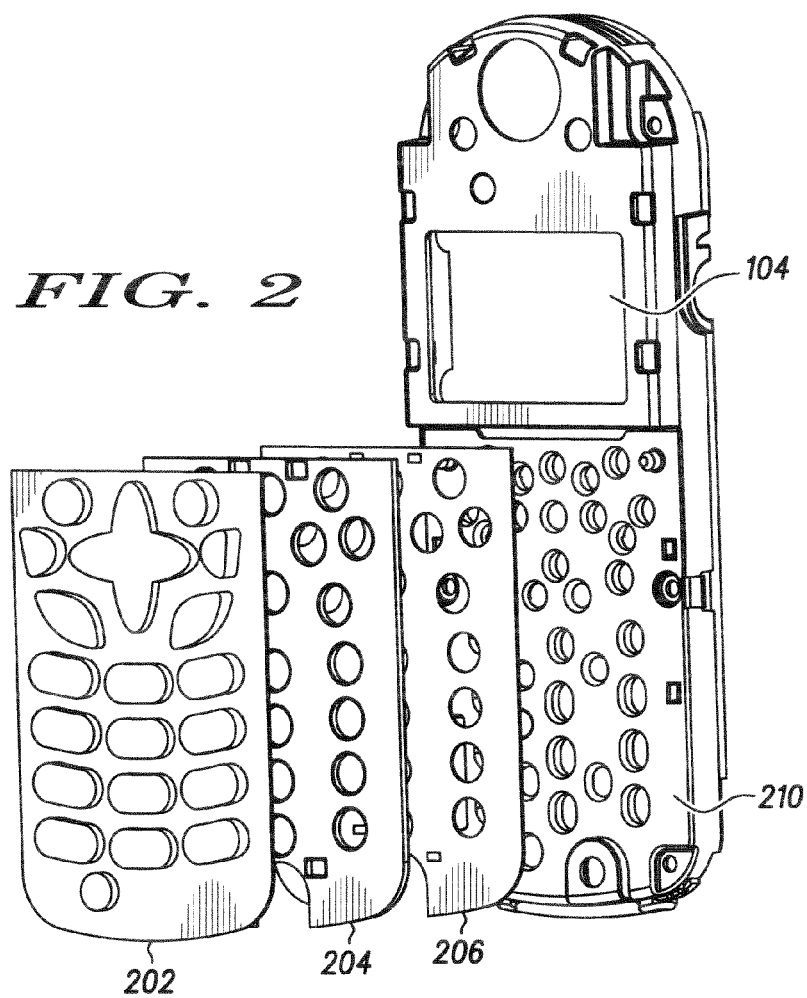
FIG. 2 is an illustration of a removable interface for attachment to a wireless device, according to one embodiment of the present invention.

FIG. 2 is an illustration of a removable interface or keypad for attachment to a wireless device, according to one embodiment of the present invention. In one embodiment of the present invention, the removable keypad of FIG. 2 can be attached to a wireless device, such as mobile telephone 100, after the removal of a stock, or standard, keypad or interface from the mobile telephone 100. FIG. 2 shows a portion or an element 210 of a mobile telephone 100, onto which a keypad assembly is attached.

FIG. 2 shows a keypad 202 including a plurality of buttons for entering information, such as telephone numbers, and providing commands, such as answering a telephone call or initiating a telephone call. FIG. 2 further shows a Flexible Circuit Board (FLEX) or Printed Circuit Board (PCB) 204 including at least one multi-colored LED or a multi-colored EL panel and an electrical circuit for supporting the at least one multi-colored LED or EL panel. In an embodiment of the present invention, the multi-colored LED or EL panel emits of any one of red light, green light and blue light. FIG. 2 further shows front housing layer 206 for securely fastening the PCB 204 and the keypad 202 to the element 210 of the mobile telephone 100. As shown in FIG. 2, the keypad 202, the PCB 204 and the front housing layer 206 (i.e., a keypad assembly) are layered on top of each other and secured onto an element 210 of the mobile telephone 100. Element 210 includes display 104. The orientation and functionality of keypad 202, PCB 204 and front housing layer 206 are described in greater detail below.

Figure 3:
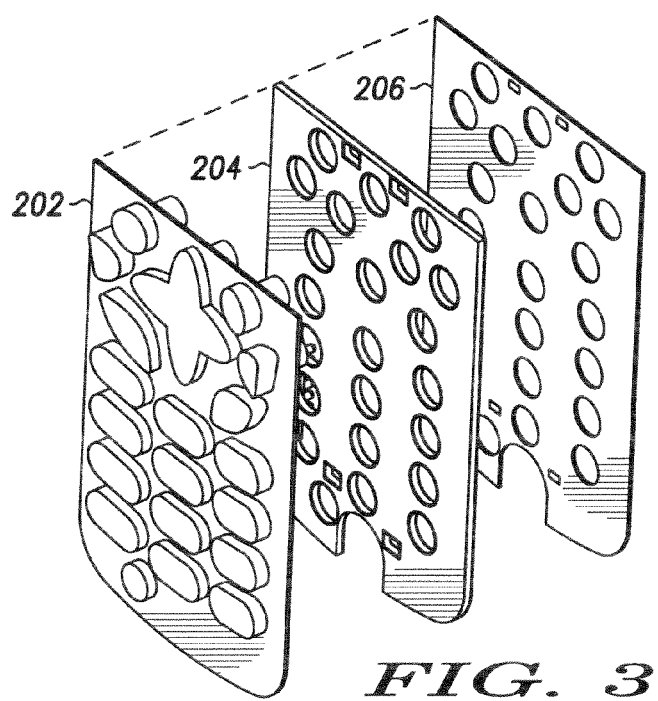
FIG. 3 is a more detailed view of the interface of FIG. 1.

FIG. 3 is a more detailed view of the user interface, or keypad assembly, of FIG. 1. FIG. 3 shows that the keypad 202, the PCB 204 and the front housing layer 206—keypad assembly—are layered on top of each other and eventually secured onto element 210 of the mobile telephone 100. The keypad assembly is described in greater detail below with reference to FIGS. 4–7.

As described above, the PCB 204 includes at least one multi-colored LED or EL panel for backlighting the keypad 202 when the mobile telephone 100 is located in an area having little or no ambient light. The at least one multi-colored LED can be a tricolor LED for emission of any one of red light, green light and blue light. Likewise, the EL panel can emit any one of red light, green light and blue light. In an embodiment of the present invention, once the keypad assembly is attached to the mobile telephone element 210, a routine in the mobile telephone 100 recognizes the existence of the keypad assembly and prompts the user to select a color of light for backlighting of the keypad 202.

One advantage of the present invention is that it allows the manufacturer of the mobile telephone 100 to provide an upgrade keypad assembly for the mobile telephone 100. For example, the stock or standard mobile telephone 100 may come equipped with one backlight color. The upgrade keypad assembly can come equipped with multi-color LEDs or an EL panel that allow a user to select the backlight color of the keypad and thus customize his mobile telephone. This is beneficial as it provides value added products that the manufacturer can offer to consumers and added features for consumers.

Figure 4:
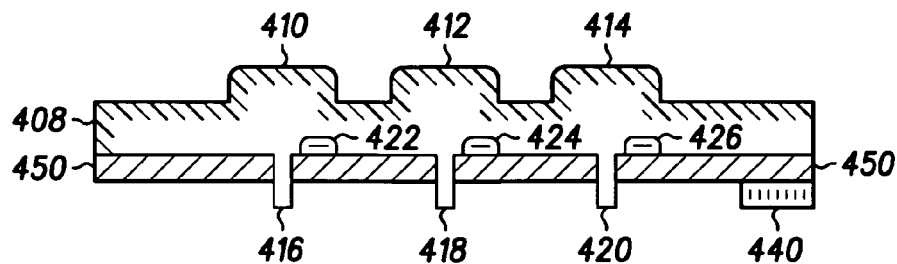
FIG. 4 is a cross sectional view of one implementation of the removable interface of FIG. 2, in one embodiment of the present invention.

FIG. 4 is a cross sectional view of one implementation of the removable interface, or keypad assembly 400, of FIG. 2, in one embodiment of the present invention. FIG. 4 shows a FLEX or PCB 450 including at least one multi-colored LED (shown as 422, 424 and 426) and an electrical circuit for supporting the at least one multi-colored LED. In an embodiment of the present invention, the multi-colored LEDs 422, 424 and 426 are tricolor LEDs for emission of any one of red light, green light and blue light. The light emitted by LEDs 422, 424 and 426 is used to backlight the keypad element 408.

The keypad assembly 400 includes a keypad element 408, which is a rubber or plastic element providing buttons 410, 412 and 414 for pushing by a user. The keypad element 408 further includes a plunger underneath each button. Plunger 416 is located underneath button 410, plunger 418 is located underneath button 412, and plunger 420 is located underneath button 414. Each plunger 416, 418 and 420 projects through an orifice in the PCB 450. As a button is pushed by a user, the pushing force results in the downward movement of the corresponding plunger underneath the button. This plunger then contacts a receptacle in the main PCB of the mobile telephone 100, to which the keypad assembly 400 is attached. In this manner, the mobile telephone 100 receives information from a user regarding the button the user desired to push.

The keypad assembly 400 further includes a connector 440. The connector 440 is connected to a receptacle in the mobile telephone 100, such as the front housing element 206 of FIG. 2. The connector 440 allows for the exchange of information between the PCB 450 and the main PCB of the mobile telephone 100, such as a color selection of the LEDs 422, 424 and 426.

Figure 5:
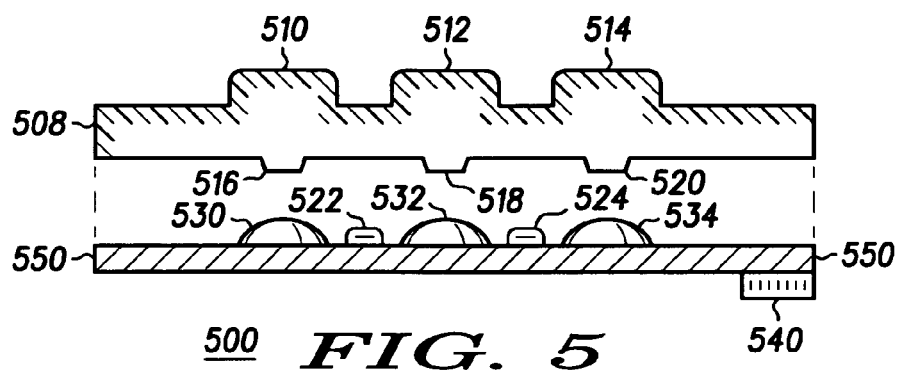
FIG. 5 is a cross sectional view of another implementation of the removable interface of FIG. 2, in one embodiment of the present invention.

FIG. 5 is a cross sectional view of another implementation of the removable interface, or keypad assembly 500, of FIG.

2, in one embodiment of the present invention. FIG. 5 shows a FLEX or PCB 550 including at least one multi-colored LED (shown as 522 and 524) and an electrical circuit for supporting the at least one multi-colored LED. In an embodiment of the present invention, the multi-colored LEDs 522 and 524 are tricolor LEDs for emission of any one of red light, green light and blue light. The light emitted by LEDs 522 and 524 is used to backlight the keypad element 508.

The PCB 550 further includes a set of domes 530, 532 and 534. Each dome is a pressure mechanism, such as a button, that allows for the input of information via pressure. When a dome is pressed, the PCB 550 receives information from a user regarding the button the user desired to push.

The keypad assembly 500 includes a keypad element 508, which is a rubber or plastic element providing buttons 510, 512 and 514 for pushing by a user. The keypad element 508 further includes a plunger underneath each button. Plunger 516 is located underneath button 510, plunger 518 is located underneath button 512, and plunger 520 is located underneath button 514. Each plunger 516, 518 and 520 projects contacts the PCB 550 at a different dome—plunger 516 contacts dome 530, plunger 518 contacts dome 532, and plunger 520 contacts dome 534. As a button is pushed by a user, the pushing force results in the downward movement of the corresponding plunger underneath the button. This plunger then contacts a dome in the PCB 550. In this manner, the PCB 550 receives information from a user regarding the button the user desired to push.

The keypad assembly 500 further includes a connector 540. The connector 540 is connected to a receptacle in main PCB of the mobile telephone 100. The connector 540 allows for the exchange of information between the PCB 550 and the main PCB of the mobile telephone 100, such as a color selection of the LEDs 522 and 524 and information regarding which button was pushed by a user.

Figure 6:
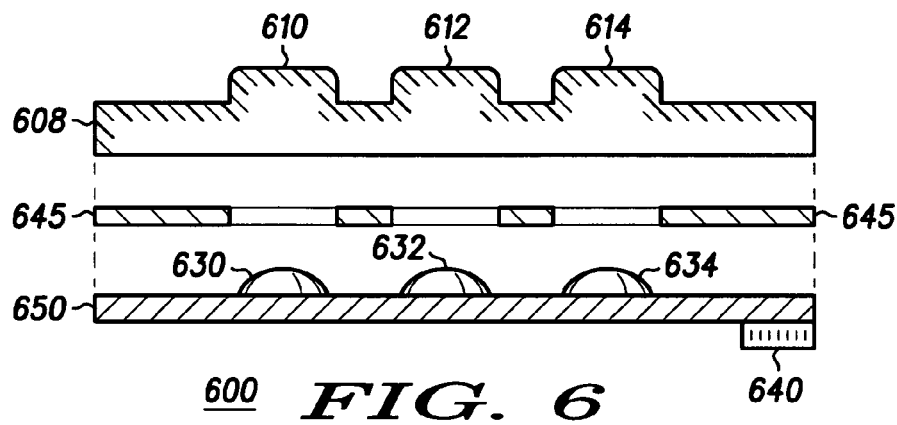
FIG. 6 is a cross sectional view of yet another implementation of the removable interface of FIG. 2, in one embodiment of the present invention.

FIG. 6 is a cross sectional view of yet another implementation of the removable interface, or keypad assembly 600, of FIG. 2, in one embodiment of the present invention. FIG. 6 shows a FLEX or PCB 650 including an electrical circuit for supporting the PCB 650. FIG. 6 also shows an EL panel 645. In an embodiment of the present invention, the EL panel 645 is capable of emitting light of various colors, such as red light, green light and blue light. The light emitted by the EL panel 645 is used to backlight the keypad element 608.

The PCB 650 further includes a set of domes 630, 632 and 634. Each dome is a pressure mechanism, such as a button, that allows for the input of information via pressure. When a dome is pressed, the PCB 650 receives information from a user regarding the button the user desired to push.

The keypad assembly 600 includes a keypad element 608, which is a rubber or plastic element providing buttons 610, 612 and 614 for pushing by a user. The underside of each button contacts the PCB 650 at a different dome—button 610 contacts dome 630, button 612 contacts dome 632, and button 614 contacts dome 634. Note that the EL panel 645 includes various orifices for allowing the underside of each button to contact the corresponding dome on the PCB 650. As a button is pushed by a user, the pushing force results in the downward movement of the area underneath the button. A dome in the PCB 650 is then contacted. In this manner, the PCB 650 receives information from a user regarding the button the user desired to push.

The keypad assembly 600 further includes a connector 640. The connector 640 is connected to a receptacle in the PCB of the mobile telephone 100. The connector 640 allows for the exchange of information between the PCB 650 and the mobile telephone 100, such as a color selection of the EL panel and information regarding which button was pushed by a user.

Figure 7:
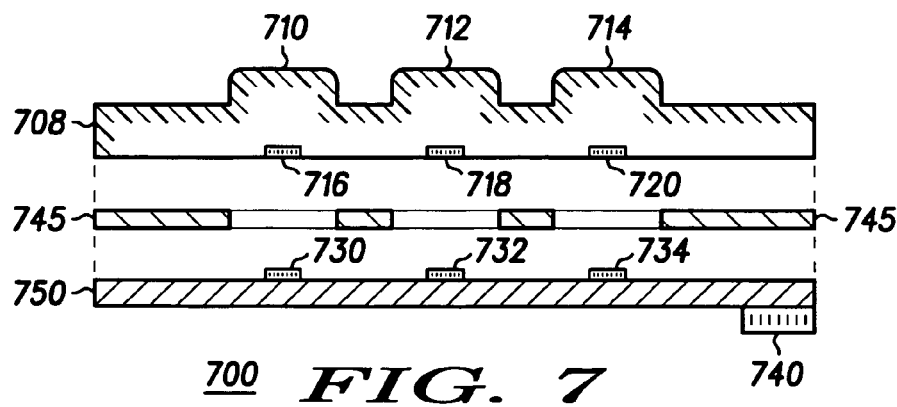
FIG. 7 is a cross sectional view of yet another implementation of the removable interface of FIG. 2, in one embodiment of the present invention.

FIG. 7 is a cross sectional view of yet another implementation of the removable interface, or keypad assembly 700, of FIG. 2, in one embodiment of the present invention. FIG. 7 shows a FLEX or PCB 750 including an electrical circuit for supporting the PCB 750. FIG. 7 also shows an EL panel 745. In an embodiment of the present invention, the EL panel 745 is capable of emitting light of various colors, such as red light, green light and blue light. The light emitted by the EL panel 745 is used to backlight the keypad element 708.

The PCB 750 further includes a set of contacts 730, 732 and 734. Each contact is a mechanism that allows for the input of information via pressure. When a contact is pressed, the PCB 750 receives information from a user regarding the button the user desired to push.

The keypad assembly 700 includes a keypad element 708, which is a rubber or plastic element providing buttons 710, 712 and 714 for pushing by a user. The underside of each button includes a contact—button 710 includes contact 716, button 712 includes contact 718 and button 714 includes contact 720. Each contact 716, 718 and 720 meets the PCB 750 at a different PCB contact—contact 716 meets contact 730, contact 718 meets contact 732, and contact 720 meets contact 734. Note that the EL panel 745 includes various orifices for allowing each keypad contact to meet the corresponding contact on the PCB 750. As a button is pushed by a user, the pushing force results in the downward movement of the contact underneath the button. A contact in the PCB 750 is then met with the contact underneath the button. In this manner, the PCB 750 receives information from a user regarding the button the user desired to push.

The keypad assembly 700 further includes a connector 740. The connector 740 is connected to a receptacle in the main PCB of the mobile telephone 100. The connector 740 allows for the exchange of information between the PCB 750 and the main PCB of the mobile telephone 100, such as a color selection of the EL panel and information regarding which button was pushed by a user.

Figure 8:
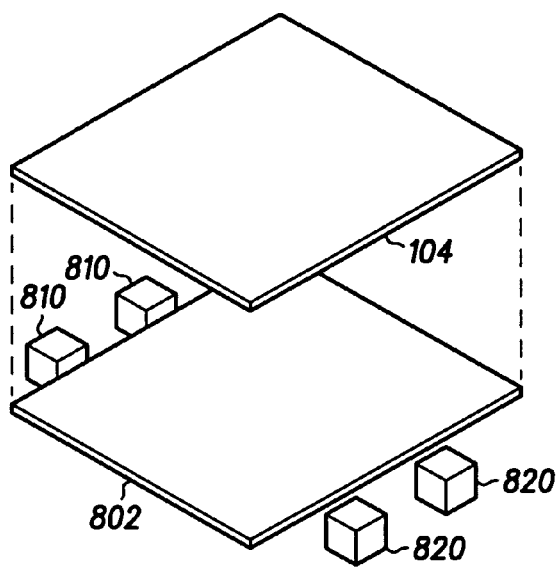
FIG. 8 is an illustration of a conventional light pipe in conjunction with an LCD display.

FIG. 8 is an illustration of a conventional light pipe 802 in conjunction with an LCD display 104 (as shown in FIG. 1). FIG. 8 shows an LCD display 104, typically used by a wireless device such as a mobile telephone 100, for displaying information pertaining to the use of the mobile telephone 100, such as telephone numbers and call status information. FIG. 8 also shows a light pipe 802 for backlighting the display 104. The light pipe 802 captures light from LEDs, such as LEDs 810 located at the top of light pipe 802 and LEDs 820 located at the bottom of light pipe 802. The captured light is then dispersed in a substantially even manner among the area of the light pipe 802, so as to backlight the display 104. Backlighting the display 104 allows a user to see the display 104 when the mobile telephone 100 is located in an area having little or no ambient light.

Figure 9:
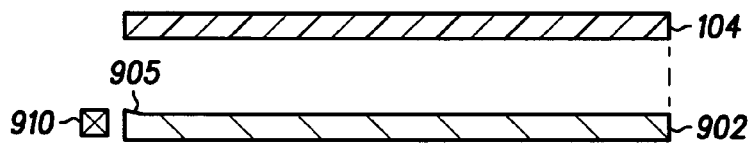
FIG. 9 is a cross sectional view of a conventional light pipe in conjunction with an LCD display.

FIG. 9 is a cross sectional view of a conventional light pipe 902 in conjunction with an LCD display 104. FIG. 9 shows a light pipe 902 for backlighting the display 104. The light pipe 902 captures light from LED 910 located at the left of the light pipe 902. The captured light is then dispersed in a substantially even manner among the area of the light pipe 902, so as to backlight the display 104. Note that the left end of the light pipe 902 is designed to capture the light emitted from the LED 910. This is accomplished by the use of a light-capturing element 905 on the left end of the light pipe 902, the light-capturing element disposed directly adjacent to the LED 910.

It should be noted that the light pipe 902 is designed to capture the light from only one LED 910. If another LED was added to the system and was located in a different position, the light pipe 902 would not be able to capture the light emitted from that LED.

Figure 10:
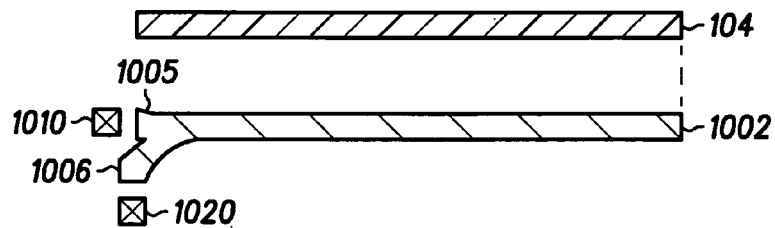
FIG. 10 is a cross sectional view of a light pipe in conjunction with an LCD display, in one embodiment of the present invention.

FIG. 10 is a cross sectional view of a light pipe 1002 in conjunction with an LCD display 104, in one embodiment of the present invention. FIG. 10 shows a light pipe 1002 for backlighting the display 104. The light pipe 1002 captures light from LED 1010 and LED 1020 located at the left of the light pipe 1002. The captured light is then dispersed in a substantially even manner among the area of the light pipe 1002, so as to backlight the display 104. Note that the left end of the light pipe 1002 is designed to capture the light emitted from the LED 1010 and the LED 1020. This is accomplished by the use of a first light-capturing element 1005 on the left end of the light pipe 1002, the first light-capturing element 1005 disposed directly adjacent to the LED 1010 and a second light-capturing element 1006 on the left end of the light pipe 1002, the second light-capturing element 1006 disposed directly adjacent to the LED 1020.

It should be noted that the light pipe 1002 is designed to capture the light from two LEDs or two different sets of LEDs. In one embodiment of the present invention, the mobile telephone 100 may be purchased with a stock, or standard, set of LEDs (such as LED 1010) for backlighting of the display 104. Thus, the light pipe of the mobile telephone 100 would be disposed to capture and disperse the light from the LEDs. Subsequently, the manufacturer of the mobile telephone 100 may provide a second set of LEDs (such as LED 1020) for upgrading the mobile telephone 100, such as multi-color LEDs for customizing the mobile telephone 100. The second set of LEDs, if added to the mobile telephone 100, would be located in a different location than the standard set of LEDs (such as LEDs 1010 and 1020). One advantage of the present invention is that the light pipe 1002 is designed to capture the light from two LEDs or two different sets of LEDs located in two different locations. This is beneficial as it eliminates the need to purchase a new light pipe when a second set of LEDs is added to mobile telephone 100.

Figure 11:
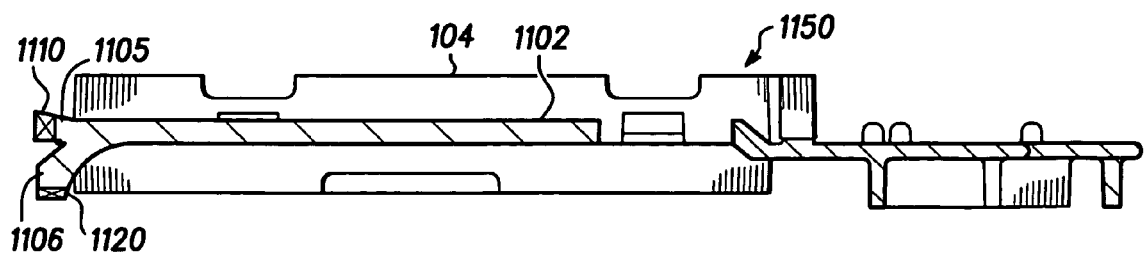
FIG. 11 is a more detailed cross sectional view of the light pipe of FIG. 1 in conjunction with an LCD display.

FIG. 11 is a more detailed cross sectional view of the light pipe 1002 of FIG. 10 in conjunction with a portion of a mobile telephone 1150. FIG. 11 shows a light pipe 1102 for backlighting a display. The light pipe 1102 captures light from LED 1110 and LED 1120 located at the left of the light pipe 1102. The captured light is then dispersed in a substantially even manner among the area of the light pipe 1102, so as to backlight the display 104. Note that the left end of the light pipe 1102 is designed to capture the light emitted from the LED 1110 and the LED 1120. This is accomplished by the use of a first light-capturing element 1105 on the left end of the light pipe 1102, the first light-capturing element 1105 disposed directly adjacent to the LED 1110 and a second light-capturing element 1106 on the left end of the light pipe 1102, the second light-capturing element 1106 disposed directly adjacent to the LED 1120.

Figure 12:
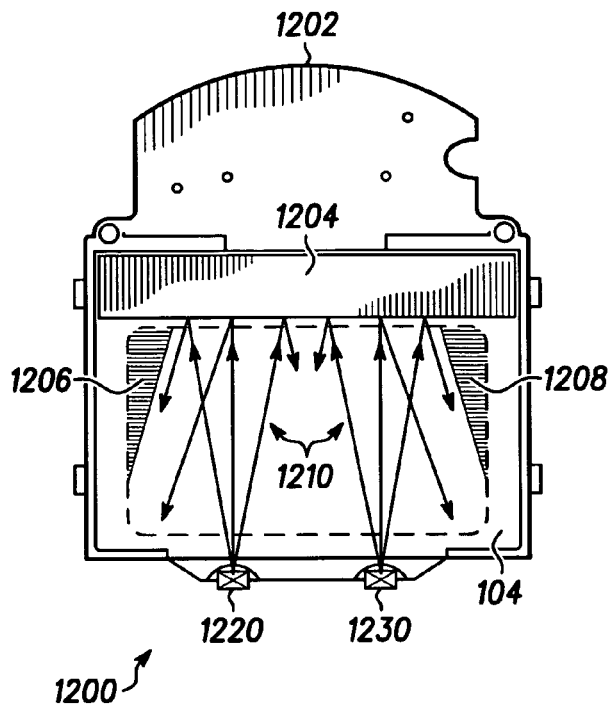
FIG. 12 is a top view of a conventional light guide assembly in a wireless device.

FIG. 12 is a top view of a conventional light guide assembly 1200 in a wireless device, such as a mobile telephone 100. A light guide assembly 1200 includes a light spreader 1204, an LCD display 104 and a portion or an element 1202 of a mobile telephone 100. A light spreader is a device used to reflect light onto a predefined area, in order to backlight the area. The light spreader 1204 is a cutout portion of the light guide assembly 1200, wherein the edge of the cutout facing the LEDs 1220, 1230 is laminated with a mirror surface for reflecting light. In FIG. 12, the light spreader 1204 reflects light emitted by LEDs 1220 and 1230 (located at the bottom of the LCD display 104) onto LCD display 104, in order to backlight, or illuminate, the display 104. Backlighting display 104 allows a user to see the display 104 when the wireless device is located in an area having little or no ambient light.

Note in FIG. 12 that due to the orientation of the LEDs 1220 and 1230 in relation to the light spreader 1204, and the shape of the light spreader 1204 (which is straight-edged), that certain dark areas 1206 and 1208 appear in the LCD display 104. That is, there are dark areas 1206 and 1208 in the LCD display 104 that appear because the light emitted from the LEDs 1220 and 1230 is not reflected onto these areas of the LCD display 104. Arrows 1210 show the path of the light as it is emitted by LEDs 1220 and 1230 and reflected by the light spreader 1204. Because these dark areas 1206 and 1208 are not backlit or illuminated, the information displayed in these areas of the LCD display 104 may not be seen, or may be difficult to see, when the wireless device is located in an area having little or no ambient light.

Figure 13:
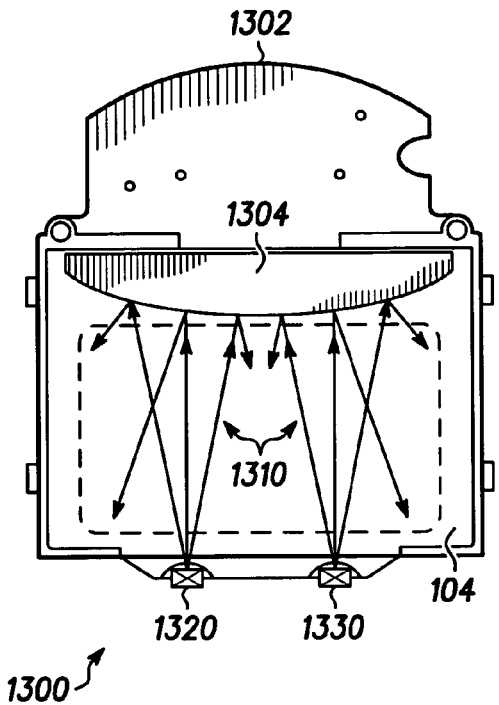
FIG. 13 is a top view of a light guide assembly in a wireless device, in one embodiment of the present invention.

FIG. 13 is a top view of a light guide assembly 1300 in a wireless device, such as a mobile telephone 100, in one embodiment of the present invention. The light guide assembly 1300 includes a light spreader 1304, an LCD display 104 and a portion or an element 1302 of a mobile telephone 100. The light spreader 1304 is a cutout portion of the light guide assembly 1300, wherein the edge of the cutout facing the LEDs 1320, 1330 is laminated with a mirror surface for reflecting light. In FIG. 13, the light spreader 1304 reflects light emitted by LEDs 1320 and 1330 (located at the bottom of the LCD display 104) onto LCD display 104, in order to backlight, or illuminate, the display 104. Backlighting display 104 allows a user to see the display 104 when the wireless device is located in an area having little or no ambient light.

Note in FIG. 13 that due to the orientation of the LEDs 1320 and 1330 in relation to the light spreader 1304, and the shape of the light spreader 1304 (which has a convex edge), that there are no dark areas in the LCD display 104. That is, there are no dark areas in the LCD display 104 because the light emitted from the LEDs 1320 and 1330 is reflected onto all areas of the LCD display 104. Arrows 1310 show the path of the light as it is emitted by LEDs 1320 and 1330 and reflected by the light spreader 1304. Because there are no dark areas in display 104, the information displayed in all areas of the LCD display 104 may be seen when the wireless device is located in an area having little or no ambient light.

It should be noted that the light spreader 1304 has a convex or curved shape. This allows for light emitted from the LEDs 1320 and 1330 to be reflected among a wider range of area over the LCD display 104. Therefore, due to the position of the LEDs 1320 and 1330 in relation to the light spreader 1304, and the convex shape of the light spreader 1304, there are no dark areas in the LCD display 104

Figure 14:
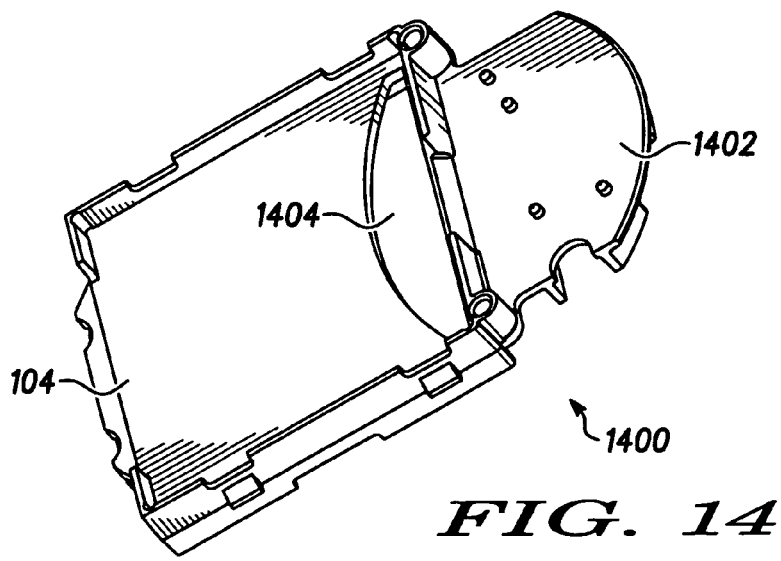
FIG. 14 is a more detailed angled view of the light guide assembly of FIG. 13.

FIG. 14 is a more detailed angled view of a light guide assembly 1400, as shown in FIG. 13. The light guide assembly 1400 includes a light spreader 1404, an LCD display 104 and a portion or an element 1402 of a wireless device, such as a mobile telephone 100. In FIG. 14, the light spreader 1404 reflects light emitted by LEDs located at the bottom of the LCD display 104 and onto LCD display 104, in order to backlight, or illuminate, the display 104. Backlighting display 104 allows a user to see the display 104 when the wireless device is located in an area having little or no ambient light.

Figure 15:
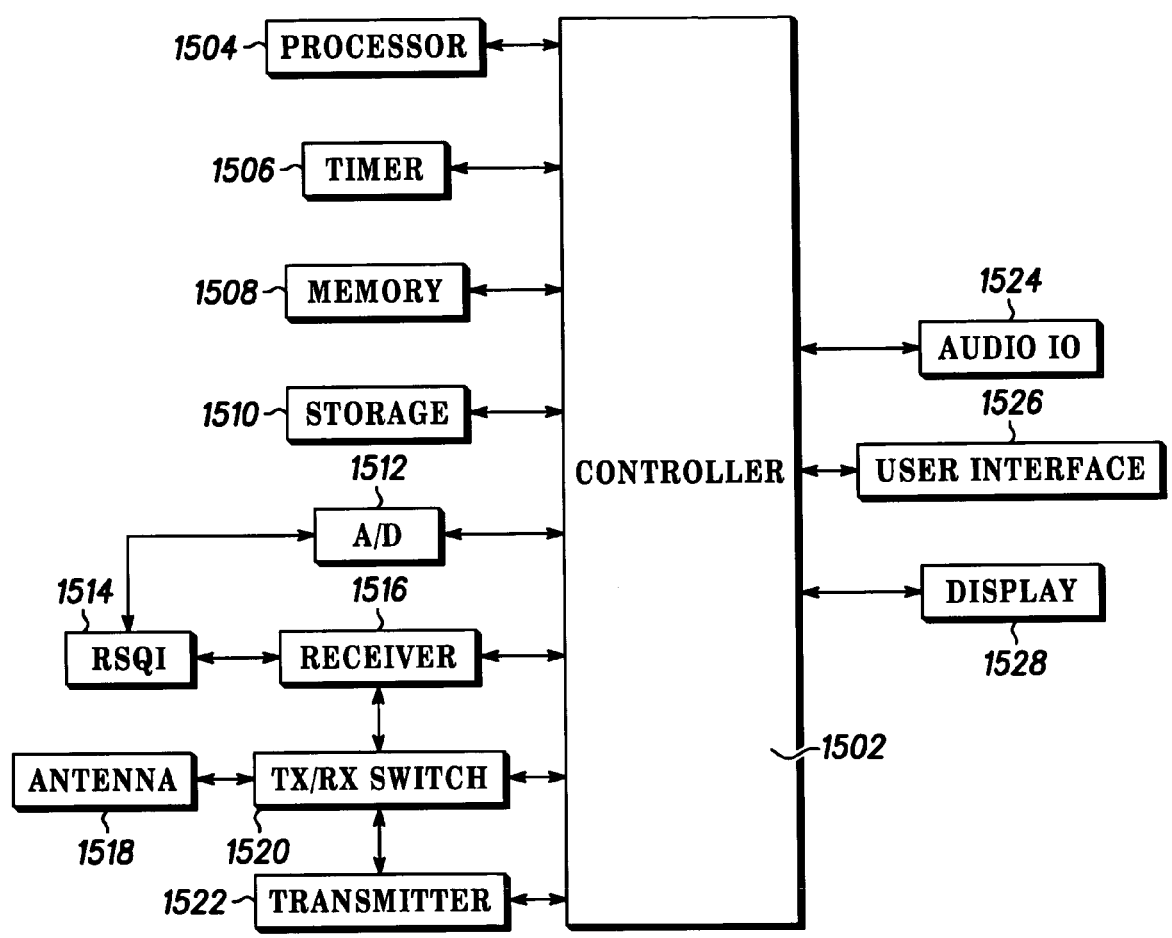
FIG. 15 is a block diagram of a wireless device useful for implementing the present invention.

FIG. 15 is a more detailed block diagram of a wireless device. In one embodiment of the present invention, the wireless device is a two-way radio capable of receiving and transmitting radio frequency signals over a communication channel under a communications protocol such as CDMA, TDMA, GSM, GPRS, FDMA or the like.

The wireless device operates under the control of a controller 1502, which switches the wireless device between receive and transmit modes. In receive mode, the controller 1502 couples an antenna 1518 through a transmit/receive switch 1520 to a receiver 1516. The receiver 1516 decodes the received signals and provides those decoded signals to the controller 1502. In transmit mode, the controller 1502 couples the antenna 1518, through the switch 1520, to a transmitter 1522.

The controller 1502 operates the transmitter and receiver, e.g., as a wireless device interface, according to instructions stored in memory 1508. These instructions include a neighbor cell measurement-scheduling algorithm. In preferred embodiments of the present invention, memory 1508 comprises any one or any combination of non-volatile memory, Flash memory or Random Access Memory. A timer module 1506 provides timing information to the controller 1502 to keep track of timed events. Further, the controller 1502 can utilize the time information from the timer module 1506 to keep track of scheduling for neighbor cell server transmissions and transmitted color code information.

When a neighbor cell measurement is scheduled, the receiver 1516, under the control of the controller 1502, monitors neighbor cell servers and receives a "received signal quality indicator" (RSQI). An RSQI circuit 1514 generates RSQI signals representing the signal quality of the signals transmitted by each monitored cell server. Each RSQI signal is converted to digital information by an analog-to-digital converter 1512 and provided as input to the controller 1502. Using the color code information and the associated received signal quality indicator, the wireless device determines the most appropriate neighbor cell server to use as a primary cell server when hand-off is necessary.

Processor 1504 in FIG. 15 performs various functions such as the functions attributed to the wireless device lighting system, as described above. In various embodiments of the present invention, the processor 1504 in FIG. 15 comprises a single processor or more than one processor for performing the tasks described below.

FIG. 15 also includes a storage module 1510 for storing information that may be used during the overall processes of the present invention. The wireless device of FIG. 15 further includes an audio input/output module 1524 for allowing the user input of audio into the wireless device and the user output of audio for listening by a user. Also included is a user interface 1526 for allowing a user to interact with the wireless device, such as to enter user input (e.g., button presses, key presses on a keyboard, touchpad entries, audio input via a microphone, and/or the like) and to provide user output (e.g., display information, illuminate visual indicator, activate audible indicator, provide sound output from a speaker, provide tactile or vibratory output, and/or the like) for modifying address book information, interacting with call data information and making/answering calls. The wireless device includes a display 1528 for displaying information to the user of the wireless device.

A preferred embodiment according to the present invention provides users the significant advantage of enhancing the ability to customize and personalize the user interface of a wireless device, such a cellular telephone, two-way radio, wireless communicator, etc. A preferred embodiment provides a very cost effective implementation of a user replaceable keypad assembly that when a main keypad assembly is replaced with a new user replaceable keypad assembly the wireless device can detect the new keypad assembly and prompt the user to select possible color illumination options. The new keypad can then be backlit according to the user selection. Additionally, the display can be switched to have the same backlit color as the new keypad. This is a significant advantage of the present invention allowing user customizable illumination of a user input interface and a user output interface.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments.

Furthermore, it is intended that the appended claims cover any and all such applications, modifications, and embodiments within the scope of the present invention.

What is claimed is:

1. An interface for coupling to a wireless device, comprising:
 a plurality of buttons for entering information;
 a circuit board disposed behind the plurality of buttons;
 at least one multicolor LED disposed on the circuit board;
 a connector disposed on the circuit board for connecting the interface to the wireless device; and
 a selector for allowing a user to define a color of light for emission by the at least one multicolor LED;
 wherein the interface is detachably coupled to the wireless device.

2. The interface of claim 1, further comprising:
 a light pipe for allowing light emitted from the at least one multicolor LED to be emitted from the plurality of buttons, the light pipe located between the at least one multicolor LED and the plurality of buttons.

3. The interface of claim 1, wherein the plurality of buttons comprises twelve buttons, the twelve buttons representing the twelve standard DTMF buttons.

4. The interface of claim 1, wherein each of the at least one multicolor LED comprises a tricolor LED for emitting any one of red light, green light, and blue light.

5. A wireless device comprising:
 a wireless device interface for communication with a wireless network;
 a user interface for coupling user input to the wireless device, the user interface including:
 a plurality of buttons for receiving user input from a user;
 at least one multicolor LED, being located behind the plurality of buttons, for emitting light that is visible from in front of the plurality of buttons;
 a connector for connecting the user interface to the wireless device;
 a circuit board for mounting the at least one multicolor LED and the connector;
 a light pipe for allowing light emitted from the at least one multicolor LED to be emitted from the plurality of buttons, the light pipe located between the at least one multicolor LED and the plurality of buttons; and
 a selector for allowing a user to define a color of light for emission by the at least one multicolor LED;
 wherein the interface is detachably coupled to the wireless device.

* * * * *